Oct. 17, 1950 — R. B. KELLOGG — 2,525,804
AIRCRAFT ROTARY BOILER TURBINE AIR CONDENSER POWER PLANT
Filed May 2, 1945 — 3 Sheets-Sheet 1

Inventor
ROBERT B. KELLOGG.
By Ralph L. Chappell
Attorney

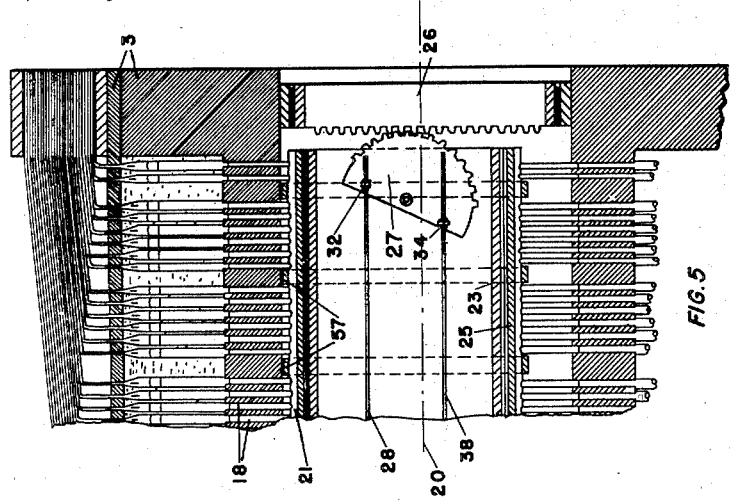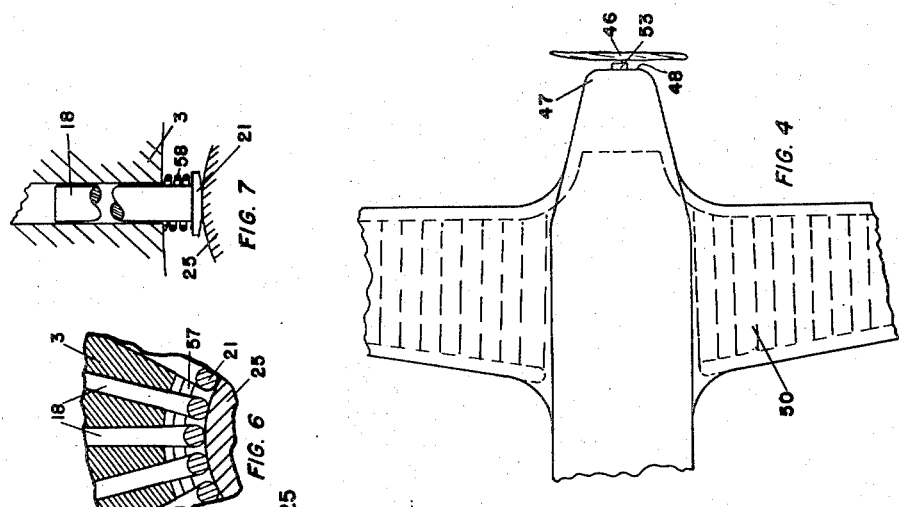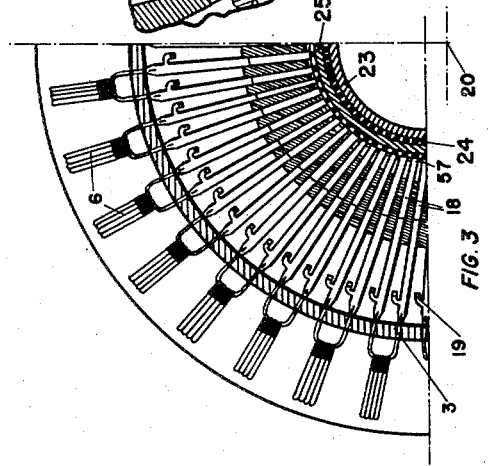

Patented Oct. 17, 1950

2,525,804

UNITED STATES PATENT OFFICE 2,525,804

AIRCRAFT ROTARY BOILER TURBINE AIR CONDENSER POWER PLANT

Robert B. Kellogg, United States Navy

Application May 2, 1945, Serial No. 591,591

8 Claims. (Cl. 60—96)

(Granted under the act of March 3, 1883, as amended April 30, 1928; 370 O. G. 757)

This invention relates to steam power plants for aircraft and more particularly to steam power plants of the turbine type having a rotary steam generator mounted axially on the turbine shaft.

The object of this invention is to construct a complete steam turbine power unit for aircraft, supplying energy to the propeller, in either a pusher or tractor type installation.

Another object is to construct a relatively instantaneous and minutely controlled source of superheated steam with which to drive light high-speed geared turbines powering main propellers, primarily for use in high flying airplanes, where a copious supply of cool air is normally available for use in the condenser.

Another object is to provide a multi-plunger water pump with variable controlled delivery for supplying the water to the several heater tubes in a steam generator, having control means for simultaneously controlling the respective deliveries in accordance with the total power desired.

Another object is to provide a rotating steam generator having radially arranged heater tubes wherein the unevaporated water is held in the outer portions of the tubes by centrifugal force, and wherein ring headers are used to distribute unevaporated water in the outer portions of said tubes and also to form a wall providing outer and inner passes for the hot combustion gases to pass around the heater tubes.

Another object is to provide a condenser means for a steam generator unit for aircraft comprising a series of condenser tubes, using the airstream in the nose of the aircraft for passing through the tubes as a cooling medium, and then into the combustion chambers as pre-heated air to support the combustion of the fuel supplied by the burners in accordance with the power desired.

Further and more specific objects will become apparent in the following detailed description of this invention having reference to the accompanying drawings, wherein:

Fig. 3 is a partial sectional view taken at the line 3—3 of Fig. 1;

Fig. 4 is a diagrammatic view showing a modified arrangement of condenser which may be used in connection with the above unit, if more condenser capacity is needed;

Fig. 5 is an enlarged sectional view of the water feed pump;

Fig. 6 is an enlarged detail view of one preferred form of pump plungers, and

Fig. 7 shows another form of pump plungers wherein the plunger is retracted by resilient means.

Figure 1:
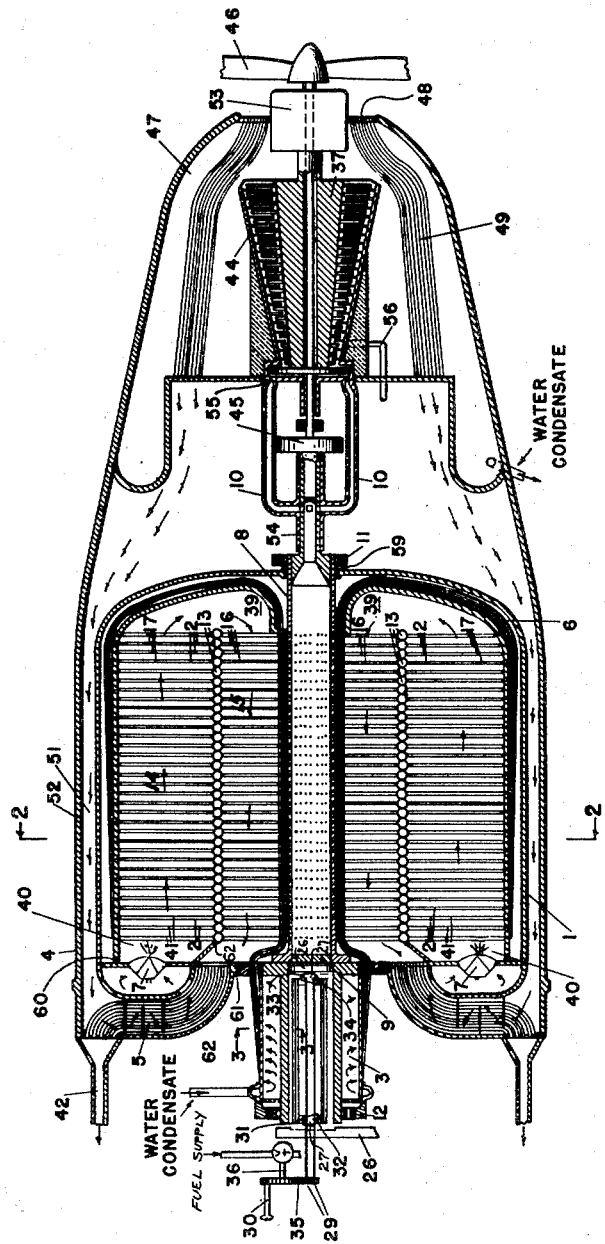
Fig. 1 is a sectional partially diagrammatic view of the entire unit.
Figure 2:
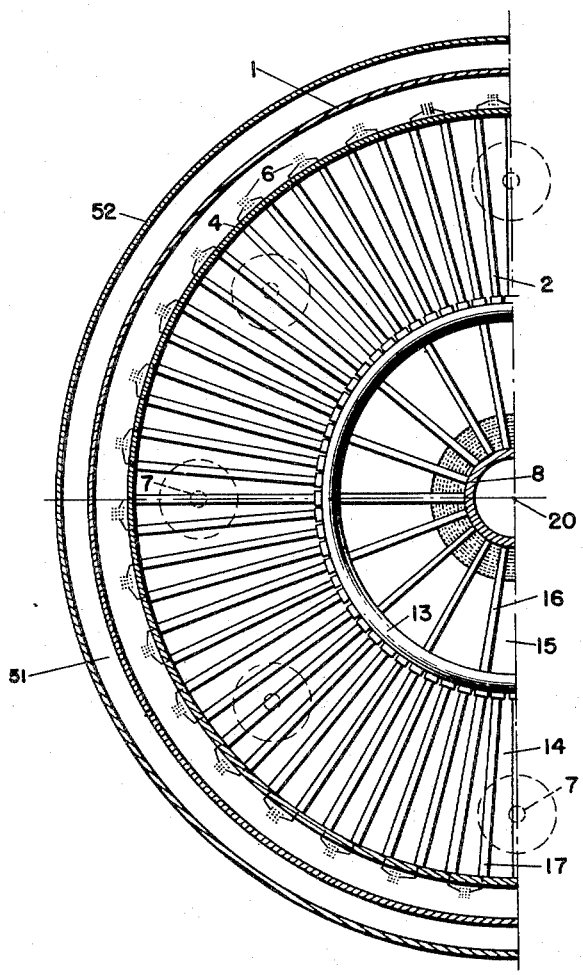
Fig. 2 is a partial section taken at the line 2—2 of Fig. 1.

The steam generator unit, shown for purposes of illustration in the present disclosure, consists of three main assemblies: the drum 1, the generating and superheating tubing 2, and the tube feed-pump assembly 3 mounted on and attached to one end of the drum; the other parts of this unit comprising the casing 4, the air preheater 5, the casing wall tubes 6, and the burners 7.

The boiler drum 1 has a hollow alloy steel shaft 8, plugged at one end 9 and open or with controlled openings to the turbine nozzle block 55 at the other end. The drum is mounted on controlled temperature roller bearings 11 and 12 at or near each of its ends, and is in continuous rotation during operation. The drum is drilled radially completely around its circumference throughout its desired length, so as to mount tubes, which may be rolled, screwed, or welded into it, at the points where it is drilled.

The generator and superheater tube surface is constructed in the form of a spider or tube ring assembly 2, the ring headers 13 themselves forming the baffle separating the first pass 14 from the second pass 15 as shown. It is expected that the second pass tubes 16 connecting the drum shaft to the ring tube headers will act as superheating surfaces, the tensile stress due to the rotational motion being entirely absorbed by the comparatively cool ring headers.

It is contemplated that unequal evaporation will, at times, be present due to fouling of fireside surfaces. At such times, there will be a tendency for the water to build up to a greater height in the tube ends 17 and may reach the annular tube ring headers 13. At such times, water spilled into these headers will distribute itself among neighboring tubes the evaporation in which has not allowed the water "level," so to speak, to reach the annular ring headers.

All tubes are straight but may be of varying lengths, as it may be desirable with closely calculated and controlled evaporations to have those in the higher temperature zone of greater length than those near the end of the pass, but in any event length of high heat zone and other tubes as well as quantity of feed per tube would be in proportion to the evaporating capacity and location.

The generator and superheating tubing would necessarily have to be of the lightest and toughest material available, as would also the drum. These highly stressed and high temperature parts should be worked out as regards safety factors on the airplane design basis and by actual experiment and test rather than by any existing formulae.

The tube feed-pump assembly 3 is constructed on the order of the oil injector plunger pump now in general use on oil engines, where the service is severe, involving high speeds, handling of minute quantities, use of pressures in the order of two or three thousand pounds at the injector plungers, and requiring practically leak-proof operation. The steam generator construction requires that each individual tube in the boiler receive a predetermined and variable quantity of feed from its own individual feed pump, the combustion of fuel at the burners and the quantity of feed to the tubes varying directly and instantaneously with the speed or load interposed, there being no steam reservoir as such. The pump will therefore have as many individual plungers 18 and check valves 19 as the generator has tubes 17. The pump 3 is mounted as a unit at one end of the generator drum, concentrically with the drum, the pump barrels being bored radially with respect to the axis 20 of the drum, and the drum to all purposes being a rotating shaft. The inner ends 21 of the revolving pump plungers are either resiliently or positively urged against and driven by one or more stationary eccentric cams 23 with adjustable eccentricity while in operation, for controlling the length of the individual pump strokes, and hence, the output, according to the adjusted eccentricity of the stationary cam. There may be one or more of these adjustable eccentrics stacked or assembled in axial alignment with each other for adjusting the amounts of feed from the corresponding banks of pumps, and therefore the temperatures successively in the corresponding banks or rows of tubes throughout the passes. On the other hand, after suitable tests and developments in operation, it may be possible to employ a single adjustable eccentric for all the tubes, designed to fit the conditions obtained throughout the range of load in any generator. The inner pump drive sleeve or eccentric 23 is vertically adjustable and forms the inner ring of a pin roller type of bearing 24 supporting the outer eccentric drive or cam sleeve 25.

The inner ring 23 is restricted against rotation but is vertically adjustable by means of a pair of racks 26 and gears 27 one at each end of the drive sleeve. The racks 26 are stationary, while the gears 27 are pivotally mounted at the ends of the inner ring 23 for simultaneous operation in opposite directions by means of the rods 28 and 38 geared together at 29, 29, to turn in opposite directions by manual means 30, and operating as turnbuckles in the nuts 31, 32, 33, and 34 swivelled on the gears 27. Thus, as the upper rod 28 is turned to draw the upper nuts 31 and 33 toward each other the lower rod 38 pushes the lower nuts 32 and 34 further apart, and vice versa, so that the gears 27 are simultaneously turned in opposite directions to either lower or raise the drive sleeve to decrease or increase its eccentricity relative to the axis 20 of the rotating member in which the pump plungers are mounted to decrease or increase their strokes, respectively, and thus control the amount of water fed to the tubes. This feed water control may be interconnected as at 35, with the control 36 of the fuel supply to the burners, so as to simultaneously regulate the feed water and fuel in accordance with the power demands.

The generator as a working unit revolves or rotates with its axial portion 8 acting as the shaft, identically as does the steam turbine spindle 37, the axial portion 8 acting as the shaft or rotor and the generating tubes 2 as the blading, the main difference being that while the steam turbine is a heat dissipating unit this is a heat generating unit. The optimum speed of rotation of the drum is low, but should be designed to be great enough for the centrifugal forces imparted to the water in the tubes 2 to keep the water in the outer ends 17 of the tubes, imparting a high "density" to the water thus trapped, allowing only steam vapor to overcome the pull of centrifugal forces and to make its way inwardly to the axial portion. The high density created and mechanically imparted to the working water is a highly important feature in this construction. The speed of the generator rotation should, however, be relatively low, depending to a considerable extent on the lateral length of the generator tubes, which means the diameter of the generator on its axial portion or shaft. An extreme turbulence in the combustion spaces 39 is obtained, gases entering from the combustion ring 40 into the first row of tubes 41 and completing the tour of both passes 14 and 15 thus scour the heating surfaces and, in a decidedly helical manner, describe a number of rotations relative to the generator casing 4 before reaching the gas outlets 42. In this connection, it may be possible that the pressure losses suffered aerodynamically from the obstruction to the airstream caused by the present device, at high speeds might be to some extent utilized in helping to revolve the generator, by arranging the tube 6 in a helical manner on the inside of the drum. It must be borne in mind, however, that the turbine 44, which is a separate unit and operating at very great rotational speeds, is nevertheless geared mechanically to the revolving generator, as the turbine cannot be operated, that is rotated, separately from the generator. A reduction gear means 45 and 53 are interposed to drive the generator 1 at about 180 R. P. M. and the propeller 46 at about 2000 R. P. M. when the turbine turns at 10,000 R. P. M. The means 53 also includes a thrust bearing for the propeller.

The entire steam generator-turbine unit may be started by external power means. For this purpose, as an illustration, a portable motor driven propeller might be used by wheeling it up to and facing the airplane propeller 46. In operating, the idle propeller 46 on the turbine unit begins to revolve, which in turn, revolves the turbine 44 and thus the steam generator unit 1 geared to it. When sufficient rotational speed of the steam generator 1 has been obtained to keep water in the tube ends 17 by centrifugal force, the burners 7 may be lighted off and feed water supply simultaneously turned on from the pump 3 in proportionate amount. Steam forming almost instantaneously then takes charge and the unit operates on its own until the combustion fuel and feed of the water are reduced to a stopping point.

It will be noted that one end, that is the end toward the turbine of the rotating generator drum or shaft is open, and has to be sealed off without excessive leakage between the drum proper and the stationary main steam pipe or nipple 54 having nozzle tubes 10 leading to the turbine nozzle block 55. However, this matter of sealing against the high pressures without employing rubbing type packing has already been well developed to a high degree in high pressure steam turbines, and more recently, in rotor shaft gland packing of very high temperature and pressure petroleum cracking still pumps. A preferable form of sealing means is a practically rubbed in fit of a series of labyrinth packing rings of which the laid over inverted V is used in some installations, while in many others, lantern glands and leak-offs are employed. However, this is not too difficult and is not an insurmountable problem in any case.

In order to conform to a compact packaging and streamlining of the power unit assembly, it is almost essential that directly behind the propeller 46 in the case of a tractor type, or in the nose 47 of the unit in any case, an opening 48 be provided, circular in form, similar to that normally present in all air-cooled radial internal combustion engines, but with possibly a much smaller flat plate area. In other words, at reasonable air speeds, from 60 to 300 miles per hour, and using the resistance of the flat plate formulae as found on page 59, chapter V of Civil Aeronautics Bulletin No. 26 of 1940, it can readily be appreciated that very considerable power saving would be made in reducing this area.

The quantity of air required for condensing a possible 30,000 pounds of steam per hour with a properly designed condenser of the type shown herein, should be not greater than that which could be passed through a flat plate area equal to that of a comparatively powered radial internal combustion engine, and through tubing having a total heat exchange surface sufficiently large, assuming a normal inside and outside temperature differential of 172° F. This is based on the assumption of a normal average temperature of 40° F. at 8,000 feet altitude near the equator and a temperature of the exhaust steam in the condenser of 212° F. after full expansion at the turbine exhaust. The total heat exchange surface needed in the condenser under these conditions is calculated to be between 5000 and 10,000 sq. ft. depending upon the coefficient of heat transfer of the material used in the condenser tubes 49. This can be reasonably well provided for in the structure illustrated in Fig. 1, although an additional amount of heat exchange surface for the condenser may be provided in the wing structure 50 of the aircraft and connected in an obvious manner, as indicated in broken lines in Fig. 4, with the portion in the nose of the unit, if circumstances require this.

The condenser, as incorporated in Fig. 1, lends itself to streamlining which the radial engine does not. Hence, the flat plate resistance can be reduced to begin with, and the air used for condensing can, in the meanwhile, be preheated for use in the combustion process at the burners.

The air passed through the condenser directly behind the propeller picks up the latent heat from the exhaust steam through the walls of the condenser tubes and then passes to the air preheater casing 52 completely surrounding the steam generator. A fin type wall structure may be used in these tubes to increase the heat transfer to the combustion air, or other high heat transfer means may be resorted to. The surrounding air 51 in the air preheater casing 52 forming the outside of the entire generator not only insulates the rest of the plane from the boiler furnace but also serves to maintain at all times a higher pressure in the space around the generator than in the furnace, thus preventing high furnace pressures from causing burning through the furnace walls and endangering the adjacent plane structure.

It will be noted that two passes 14 and 15 are provided for in the generator illustrated, although the structure may not be limited to only the two, as shown, but may be designed with any number of passes arranged in any form, and, if necessary, some booster burners might be provided at the beginning of the second pass 15 or at any other point in the path of the hot gases throughout the boiler.

As in many other steam power plants, a portion of the steam may be bled from any point 56 in this turbine power plant and used for air ejectors, plane heating, as well as cooling, or air conditioning.

The multiplicity of individual feed tubes necessary in the present construction, might appear to be complicated. However, this complication is far less than the complication of structure found in a modern gasoline radial engine of comparative horsepower. Likewise, the multiplicity of pumps used might appear complicated, but they are based on the operation of fuel oil pumps for Diesel engines, now in use, which have been perfected to a high degree.

A preferred form of pump plunger operating means is shown in Figs. 3, 5 and 6, although it may be of the more common form shown in Fig. 7. The latter is of the resilient return type, wherein a spring 58 is provided around the plunger 18 between the casing of the pump 3 and a shoulder on the end of the plunger 21 which abuts against the operating cam or eccentric sleeve 25. In the preferred form in Figs. 3, 5 and 6, the several plungers in axial alignment are made integral with a common base rod 21 which abuts against the cam or eccentric sleeve 25 and is held thereagainst for limited free rocking and sliding with respect thereto by slip rings 57, which are common to a series of these rods connected with all the other pump plungers distributed radially around the pump casing. These slip rings provide for a positive return of the pump plungers.

Sealing means are provided at 59, 60, 61, and 62 between the stationary elements and the moving generator unit.

It should, therefore, be clear that a construction of the type shown herein for purposes of illustration is entirely feasible, and may be readily constructed with the modern equipment now available. Although only one form of the invention is herein shown and described, it is to be understood that many variations in arrangement and construction of the various parts may be made without departing from the spirit and the scope of this invention, as defined in the appended claims.

The invention described herein may be manufactured and used by or for the Government of the United States of America for governmental purposes without the payment of any royalties thereon or therefor.

What is claimed is:

1. A steam turbine power plant for aircraft comprising a rotary steam generator having a multiplicity of heater tubes therein, a multiplunger water pump having a manual quantity control, mounted axially on said generator for rotation therewith, and for supplying individual charges of water to the several heating tubes in the generator, a turbine operated by steam from said generator and mounted axially in front thereof, reduction gearing, said reduction gearing being connected to the steam turbine and rotary steam generator for simultaneous rotation of the higher speed turbine and the generator, a condenser surrounding and in front of the turbine, a series of burners annularly arranged at the rear end of the generator fed by fuel means for controlling the fuel flow simultaneously with the control of said water pumps in accordance with the power demand, there being passages for the exhaust steam from the turbine through the condenser and a water drain passage for the condensate from said condenser back to the water pump, a heat exchanger at the rear of said burners, and air passages for air taken in at the front of the condenser and passed through the condenser, then around the turbine and generator back through said heat exchanger to the annularly arranged fuel burners for supporting the combustion of the fuel and providing the hot gases of combustion which are then passed through the generator as the heating medium and discharged at the rear thereof through said heat exchanger into the atmosphere.

2. In combination, an aircraft propeller, a shaft for said propeller, a steam power plant for aircraft comprising a streamlined external power plant housing having a front opening around said shaft for admission of an air stream, a partition forming a condenser chamber in the nose back of said opening, a steam turbine for driving said propeller mounted at the rear of said chamber and exhausting into said chamber, a plurality of cooling tubes in said chamber connecting at their forward ends with said opening and discharging at their other ends through said partition, a rotary steam generator mounted in heat-insulating bearings back of said partition and driven by said turbine through reduction gearing of the order of 100 to 1, a multi-plunger pump casing having radially arranged plungers mounted at the rear of said steam generator, a stationary but adjustable eccentric cam for actuating said plungers upon rotation of said generator, fuel burners at the rear of said generator, and means for controlling fuel supplied to said burners simultaneously with the adjustment of the eccentricity of said cam, whereby to regulate the power delivered to said propeller.

3. The combination defined in claim 2 wherein said generator is substantially cylindrical in form having a hollow perforated shaft, a perforated outer wall, an annular front end wall about said shaft, an intermediate cylindrical baffle formed by a series of adjacent steam header tube rings, the front end of said baffle being spaced from the front end wall, a series of steam generator tubes radially extending between the perforations in said outer walls and said headers, a series of radial superheater tubes extending between the shaft perforations and said headers, and feed water tubes connecting the outside of said outer wall perforations individually to each of the pump plunger delivery ports, a common supply chamber for said pump plungers, and a conduit for delivering the condensate from said condenser to said common supply chamber.

4. The combination defined in claim 3, said hollow shaft being closed at its rear end and opening at its front end through circumferential ports and a collector ring passage to steam take-off tubes, and a turbine nozzle block supplied by said take-off tubes.

5. The combination defined in claim 3, said feed water tubes being passed forwardly from said perforations over the front end wall and through said wall rearwardly along the outside of said hollow shaft to said pump plungers.

6. The combination defined in claim 5, a stationary casing over the outside of said feed water tubes in front of said front end wall and around said outer wall but spaced from said power plant housing to provide an annular passage for the air from said cooling condenser tubes to the rear of said generator, an annular heat exchanger at the rear of said generator for receiving said air from said annular passage and delivering it to said fuel burners arranged annularly at the rear of said steam generator tubes, said heat exchanger having inlets annularly arranged at the rear of said superheater tubes for receiving hot gases of combustion and outlets for the discharge of said gases rearwardly adjacent said power plant housing wall.

7. A steam turbine power plant for aircraft comprising a rotary steam generator, a water pump mounted axially on said generator for rotation therewith, a steam turbine mounted axially in front of said generator, a steam turbine, reduction gearing connecting the higher speed turbine to the rotary steam generator for simultaneous rotation, means for leading steam from the generator to the turbine, a burner arranged at the rear of the generator fuel feed means, means for simultaneously controlling the fuel feed and water pump feed in accordance with the power demand, a condenser, a heat exchanger, a conduit for the exhaust steam from the turbine through the condenser, a water drain passage from the condenser back to the water pump, and air passages leading through the condenser, then around the turbine and generator back to the fuel burners for supporting the combustion of the fuel and for providing the hot gases of combustion, conduit means for moving the hot gas through the generator and said heat exchanger into the atmosphere.

8. The combination of claim 7 further defined in that the said means for leading steam from the generator to the turbine extends from centrally of the steam generator and around the reduction gearing to the turbine.

ROBERT B. KELLOGG.

REFERENCES CITED

The following references are of record in the file of this patent:

UNITED STATES PATENTS

| Number | Name | Date |
|---|---|---|
| 785,472 | Brown | Apr. 21, 1905 |
| 1,800,124 | Wagner | Apr. 7, 1931 |
| 1,803,156 | Wagner | Apr. 28, 1931 |
| 1,808,439 | Serriades | June 2, 1931 |
| 1,842,301 | Uebelmesser | Jan. 19, 1932 |
| 1,994,009 | Vorkauf | Mar. 12, 1935 |
| 2,079,923 | Pavlecka | May 11, 1937 |
| 2,160,281 | Price | May 30, 1939 |
| 2,168,166 | Larrecq | Aug. 1, 1939 |
| 2,171,047 | Richardson et al. | Aug. 29, 1939 |
| 2,171,817 | Wagner et al. | Sept. 5, 1939 |
| 2,208,984 | Jahn | July 23, 1940 |
| 2,257,854 | Peterson | Oct. 7, 1941 |
| 2,294,350 | Price | Aug. 25, 1942 |

FOREIGN PATENTS

| Number | Country | Date |
|---|---|---|
| 31,725 | France (Addition to 615,351) | Jan. 25, 1927 |
| 694,521 | Germany | Aug. 2, 1940 |